Dec. 17, 1935.    A. D. BLUMLEIN ET AL    2,024,271
MOVING COIL ELECTROMECHANICAL DEVICE
Filed Feb. 26, 1931    4 Sheets-Sheet 1
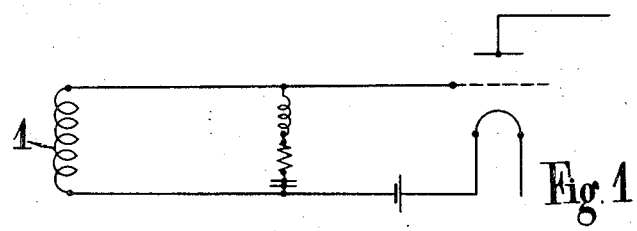
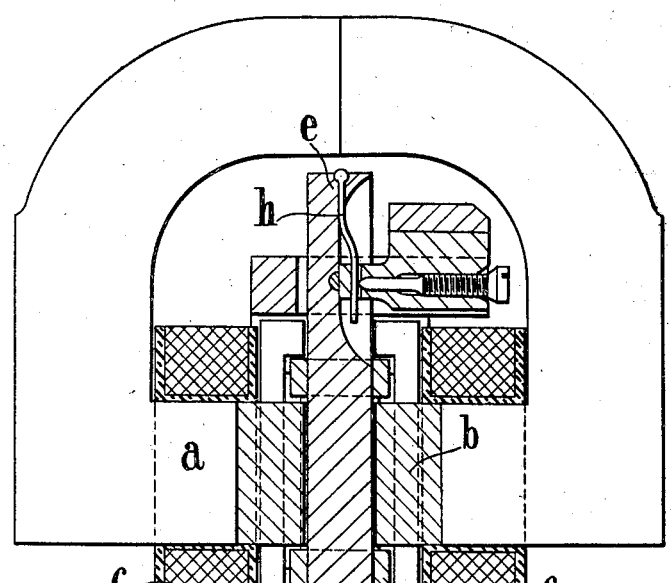
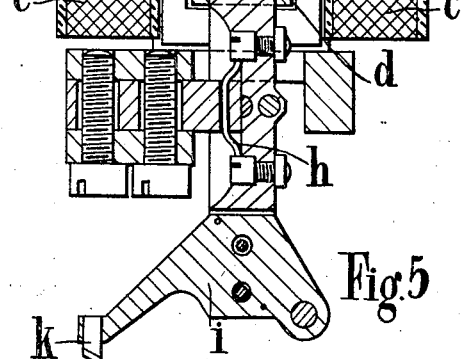
A.D. Blumlein
H.E. Holman
INVENTORS
By: Marks & Clerk
Attys.

Dec. 17, 1935.　　A. D. BLUMLEIN ET AL　　2,024,271
MOVING COIL ELECTROMECHANICAL DEVICE
Filed Feb. 26, 1931　　4 Sheets-Sheet 3

A. D. Blumlein
H. E. Holman
INVENTORS

By: Marks & Clerk
Attys.

A. D. Blumlein
H. E. Holman
INVENTORS

Patented Dec. 17, 1935

2,024,271

UNITED STATES PATENT OFFICE 2,024,271

MOVING COIL ELECTROMECHANICAL DEVICE

Alan Dower Blumlein and Herbert Edward Holman, London, England, assignors to Columbia Graphophone Company, Limited, London, England Application February 26, 1931, Serial No. 518,524
In Great Britain March 10, 1930

3 Claims. (Cl. 179—180)

This invention relates to moving coil electromechanical devices, more especially such as are employed in sound recording or reproduction. The invention is directed more specifically to an electromagnetic moving coil recorder for cutting sound records in wax or other like discs or blanks; but is, in general, applicable to many other moving coil devices such as microphones which may be employed for example in a sound recording system embodying a recorder of moving coil type, or of any other form. Similarly the invention may be applied, in sound reproduction for example, to pick-ups or moving coil loud-speakers, or optical recording or projection devices.

If a moving coil vibratory device pivoting in a magnetic field is connected to an external circuit and caused to vibrate by mechanical means, it is well known that an E. M. F. will be generated in the coil and will cause a current to flow through it and the external circuit. This current will produce a mechanical force which will tend to modify the movement, and if the impedance of the whole purely electrical circuit is resistive this force will exercise a purely damping effect. In the present invention this principle is used to produce damping in the vibratory device and in order that the effect may be as great as possible three things are necessary: first that the impedance of the moving coil circuit, for a given configuration and numbers of turns, shall be as small as possible; secondly that this purely electrical impedance shall be as purely resistive as possible, and lastly that the flux density in which the moving coil is situated shall be as high as possible.

It is well known in this connection (cf. Butterworth Proc. Phys. Soc. of London, vol. 27, 1915, p. 410) that the impedance of an electromechanical device of the electromagnetic class can be represented in general by an electrical impedance network consisting of two main parts in series, the one purely electrical and independent of the motion of the device and the other electromechanical and governed purely by the motion. The former, or pure electrical impedance, is equal to the impedance of the device when the vibratory element is rigidly clamped and the latter or electromechanical impedance is equal to the vector difference between the impedance values when the vibratory element is free and when it is clamped. According to the present invention, the pure electrical impedance combined with that of the external circuit to which the device is connected is made small in comparison with the electromechanical impedance of the device in the neighborhood of the frequency or frequencies at which the device resonates.

One object of the invention is to improve the response characteristics of such apparatus more especially at resonance frequencies in order that the response curve obtained may be flat over a wide range, or, at least, of such small and smooth variation over its working range as to be easily corrected by modifications in the electrical circuits introduced; and in order to effect this the vibratory parts of the apparatus are adapted to obtain damping from an electrical circuit connected therewith.

The invention consists in a method, in electromechanical moving coil vibratory apparatus, of introducing electromagnetic damping to control the mechanical resonance of the system by arranging that the pure electrical impedance of the electrical circuit embodying the moving coil shall be very small at the frequency or frequencies at which the mechanical system is resonant.

The invention also consists in a method, in electro-mechanical vibratory apparatus, of controlling resonance by shunting the driving circuit of the vibratory member or members by one or more impedances so arranged as to have a low impedance value at the resonant frequency or frequencies of the vibrating parts, but higher at other frequencies.

The invention further consists in an electromechanical moving coil sound recorder provided with electromagnetic damping, as specified for example in the preceding paragraphs.

The invention also consists in a moving coil microphone provided with electromagnetic damping of character indicated above.

Further features of the invention will appear from the following description of a few modifications thereof which are, however, given purely by way of example and must be understood not to limit the invention in any manner. This description will be more easily understood by refererce to the accompanying drawings of which:—

Figures 1 and 2 represent, in the usual symbols, damping and equalizing electrical circuits in accordance with the invention suitable for use with a moving coil microphone;

Figures 5, 6 and 7 represent, in section, respectively the side elevation, front elevation and plan of a sound recording device, according to the invention, the field magnet being omitted.

Figure 2:
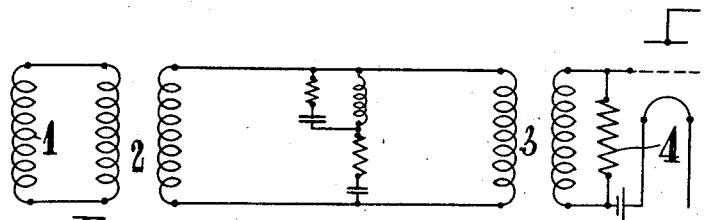

In carrying the invention into effect in one convenient manner a moving coil electromechanical vibratory system may be made of any suitable or usual form, and in order to control the resonance of such system electromagnetic damping may be introduced into the system through the same electromechanical coupling as is used to drive the mechanical system, or to obtain electrical energy therefrom, according to the function of the apparatus considered. For this purpose it is necessary to terminate the moving coil electrical circuit in such a manner that the impedance of the moving coil and external electrical circuit connected thereto is small at those frequencies at which the damping is required to be operative and in order that the damping may be as effective as possible it is necessary for the magnetic field in which the moving coil oscillates to be as high as possible. Thus any small movement of the moving coil will induce in the circuit comprising the moving coil and external electrical circuit connected thereto, an E. M. F. which will cause currents to flow through the moving coil tending to produce forces opposing the movement of such coil. It will be seen, therefore, that in order to obtain good damping it is necessary for the moving coil to be closed by an electrical circuit, the impedance of which is such as to make the impedance of the moving coil circuit a minimum, and as this latter impedance usually approximates to a pure resistance the optimum impedance for the external circuit in order to produce maximum damping becomes a very low impedance compared with the moving coil. If, however, the external circuit is made with a suitably low impedance to produce good electromagnetic damping the power efficiency of the device is impaired due to the want of balance between the impedances of the moving coil and the external circuit.

In one arrangement in accordance with the invention these difficulties are met by shunting the moving coil by an impedance or network of impedences, the impedance of which at frequencies approximating to resonance is small but large at frequencies far removed from resonance. Such shunt networks may be of any suitable kind; and since their form will obviously depend upon various mechanical and elastic characteristics of the apparatus for which they are to be used they will probably vary from one device to another. In one simple arrangement shown in Figure 1, suitable for example for use with a moving coil microphone which has one resonant frequency conveniently adjusted to a suitable value at or below 500 cycles per second there may be arranged to close the moving coil circuit I a shunting impedance consisting, for example, of an inductance, condenser and resistance in series (as shown) so arranged that the inductance and condenser resonate at the main resonance frequency of the microphone. The generated impulses are fed for amplification to a thermionic valve represented diagrammatically in the usual way. The value of the resistance may be chosen so as to be low in comparison with the resistance of the moving coil; and by such an arrangement sufficient damping may be obtained at frequencies close to resonance, while at very low frequencies and very high frequencies the circuit shunting the moving coil will have a very high impedance and so will not reduce the efficiency of the device; while by suitably choosing the value of the condenser and inductance the characteristics of the microphone may be partially or completely equalized.

In cases where the impedance of the moving coil does not approximate to a pure resistance it may be desirable to introduce residual reactances into the impedance of the circuit shunting the moving coil, the reactance being so chosen as to neutralize the reactance of the moving coil and also reduce the impedance of the moving coil circuit at frequencies close to the mechanical resonance.

In practice it is found that on account of constructional difficulties, the impedance of the microphone windings cannot be made of a high value and the damping shunt of Figure 1 is therefore unsatisfactory, since it becomes necessary to employ a very large capacity; and further since the first valve of the amplifier, to which the generated impulses are fed, is working inefficiently under this system. A modified form of shunt may therefore be employed in place of that shown in Figure 1; and one preferred form is represented in Figure 2, in which impulses from the moving coil I are passed to a transformer 2 having a step-up ratio whereby the impedance of the moving coil circuit is increased (from say 15 Ω to 1000 Ω, for example) and from that transformer to a second transformer 3 which steps-up the impulses from the resonant circuit to the grid of the first amplifying valve. In order to control resonance in the circuit formed by the valve capacity and the secondary of transformer 3 this winding may be shunted by a suitable resistance 4. Across the leads between the transformers is inserted a shunt shown in Figure 1 (comprising in series an inductance, resistance and capacity) having an impedance of a value comparable at the lowest frequencies with that of the moving coil in order to maintain efficiency. At high frequencies however the impedance of the moving coil increases and therefore the current flowing for any given E. M. F. is reduced. To compensate for this there may be connected, in parallel with the shunt inductance, a resistance and capacity in series, as shown, adapted to maintain resonance at high frequencies.

It is to be understood that many modifications of the aforementioned damping and equalizing circuits may be employed, comprising, for example, the addition of series elements in the connections; but it will be noted that the equalization described is effective in controlling not only the amplitude of the oscillations but also the phase relationships.

Figure 3:
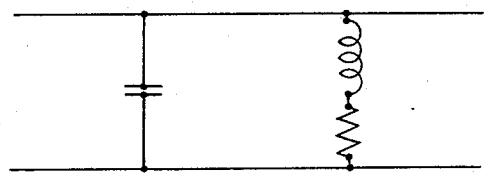
Figures 3 and 4 represent similar circuits adapted to be employed with a moving coil sound recorder.

In another simple form of circuit, as shown in Figure 3, suitable for an electromagnetic moving coil sound recorder (to be described more fully below), the shunt may consist of a condenser in parallel with a series inductance and resistance. The values of these elements are again chosen so that the total impedance of the shunt is very small at the frequency of resonance of the moving coil, but high at high frequencies.

In the case of a recorder it is not desirable to have an even response at all frequencies inasmuch as it is advisable to depreciate the low-frequency response to avoid excessive amplitude on the record. Hence, in the present case, no attempt is made to employ a shunt the impedance of which rises below resonance and it is accordingly allowed to tend to a constant limiting value as the frequency is reduced.

The condenser shown in parallel has the effect of tuning the recorder with its inductive shunt to resonance at a high frequency, say about 5,000 cycles per second, so that at this point the impedance is matched with that of the amplifier output so as to give optimum energy transfer.

Figure 4:
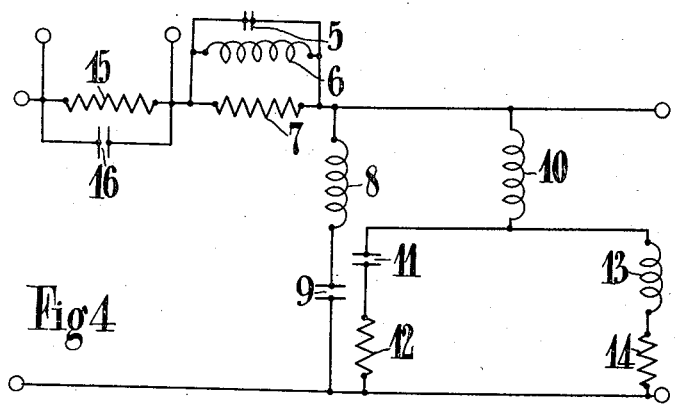

In practice it is found that while such a simple circuit is quite effective there still remain some slight errors in the characteristic which necessitate further correcting elements, rendering the circuit somewhat more complicated. It must be understood that any suitable form of circuit may be employed according to the requirements for the particular apparatus in use; and for use, for example, with the moving coil recorder referred to it may take the form shown in Figure 4. In this network a condenser 5, inductance 6 and resistance 7 all in parallel may form part of one of the input leads to the moving coil, which may be shunted by two lines, one consisting of an inductance 8 and capacity 9 in series; and the other an inductance 10 in series with two parallel branch connections comprising respectively a series capacity 11 and resistance 12 and a series inductance 13 and resistance 14. A monitoring circuit may be connected to points on the input lead across a resistance 15 (which may conveniently have a value of 12 Ω, for example) shunted by a condenser 16 (which may be of 6 MF capacity). In such a case the other elements may have substantially the following values:—

| | | | | |
|---|---|---|---|---|
| Condenser 5 | 1.3 MF | Inductance 10 | 6.75 MH | |
| Inductance 6 | 40.0 MH | Capacity 11 | 40.0 MF | |
| Resistance 7 | 100.0 Ω | Resistance 12 | 4.0 Ω | |
| Inductance 8 | 2.5 MH | Inductance 13 | 5.0 MH | |
| Capacity 9 | 0.145 MF | Resistance 14 | 11 Ω | | but it must be understood that the invention is not limited to such values which may be varied in any manner and to any extent desired or necessary.

The above equalizer has been found to be effective when operated from an amplifier having an output impedance of 300 ohms with a recorder the resistance of the moving coil of which, transferred to its operating terminals, had a value of 40 ohms. It was further necessary to adjust the response characteristic of the amplifier so that an increase of amplification of 10 db was obtained at 3500 cycles per second as compared with the low frequencies. It must be noted that with devices of this type it is often advantageous to effect some of the equalization in one of the associated amplifiers.

Figure 6:
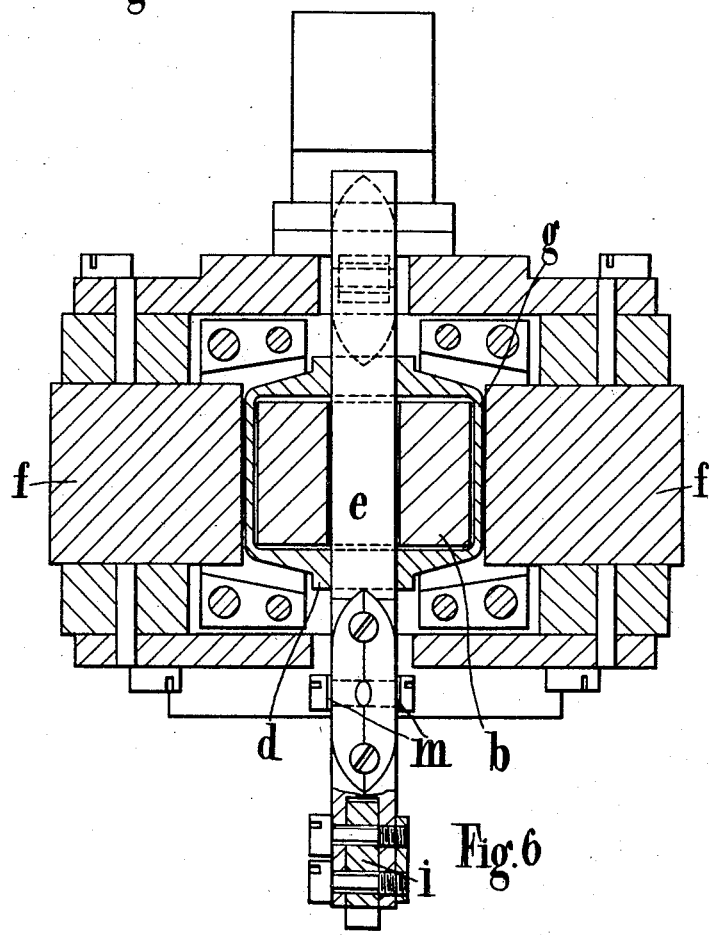
Figure 7:
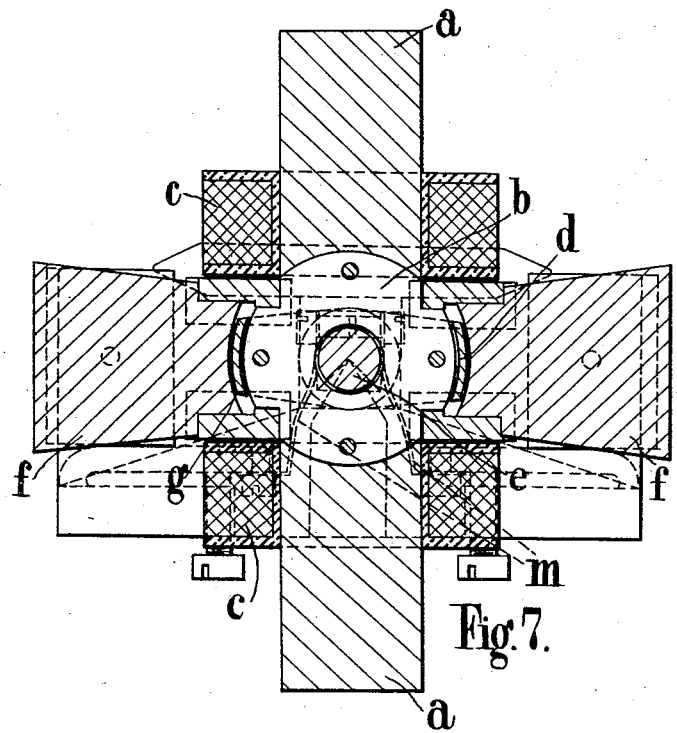

In recording sound by means of an electromagnetic moving coil recorder the recorder may conveniently take the form shown in Figures 5, 6 and 7. This apparatus comprises essentially an electrical transformer core $a$, preferably joined together by its ends to form a complete circuit for the permeating magnetic flux as shown, and preferably laminated to reduce reluctance to a minimum, thickened at one point in its length to form a cylindrical bulbous portion $b$. Adjacent to and on opposite sides of this bulbous portion $b$ are wound the primary coils $c$ of the transformer, through which are passed varying audio-frequency electric currents dependent upon characteristics of the sound being recorded. Mounted to rotate about an axis passing through the axis of the bulbous portion, and encircling it, is a rigid coil $d$ consisting of a single turn of material, such as aluminium, having small electrical resistance and low density. To obtain the required low resistance such a coil may be suitably cut from a solid block of the material. The coil $d$ may have a substantially rectangular shape, in which case the two sides parallel to the axes of rotation are cut as thin and narrow as possible (subject to the desired strength and resistance), while the other two sides may have increased width and thickness as they approach the axis of rotation. In this way the electrical resistance is reduced without materially increasing the moment of inertia of the coil. For the purpose of mounting the coil for rotation there may be integral with it, shafts extending outside the coil along the desired axis. Alternatively, a separate single shaft $e$, as shown, may pass through suitable holes in the thickened portion of the coil, and through a clearance hole in the bulbous portion of the transformer core. It will now be clear that variations in the audio-frequency currents passed through the primary windings $c$ of the transformer will induce corresponding currents in this rotatable coil $d$, which encloses the same core.

With their magnetic axes at right angles to the axis of the transformer core, and to the axis of rotation of the coil, are mounted, one on each side of the coil, the poles $f$ of a permanent or electro-magnet (not shown in the drawings). These poles are shaped to form concave cylindrical surfaces corresponding with the convex cylindrical surfaces of the bulbous portion $b$ of the transformer core, and are mounted as near as is possible thereto, to reduce the air gap $g$ to a minimum possible for clearance of the coil $d$ the curved sides of which are movable in the curved air gap. The bulbous portion $b$ of the transformer core forms also a core between the magnetic poles $f$ thus assuring a strong and uniform field.

It will be seen that the superposition of this magnetic field on the coil $d$ in which audio-frequency currents are being induced will cause it to oscillate about its axis of rotation. To ensure that in rotation the coil does not contact with the core or magnet the pivoting shafts may be located by bearings, knife edges or elastic connections. Such bearings and support for the coil must be carefully insulated or suitably positioned so that no short circuited turn of low resistance is made round the audio-frequency A. C. flux path.

The shaft $e$ may be kept in contact with the knife-edges and located vertically by means of springs $h$ attached to the shaft and passing through holes in the knife-edge in which they may be clamped. The mean or neutral position of the coil may be located by springs $m$ (Figure 7) attached to screws on the shaft, which may be adjustable and serve to tune the mechanical resonance to any frequency desired.

The movements induced in the coil $d$ are used by suitable connection to a recording stylus $k$ to cut the wax disc or other blank. In one such arrangement, a short arm $i$ is fitted to the shaft, and carries at its other end the stylus $k$ substantially parallel to the shaft axis. The axis of the shaft is, in this case, mounted perpendicular to the wax surface; but it will be appreciated that many other orientations are possible, and the invention is not limited to this arrangement.

Unless mechanical or electrical damping of some type is introduced the mechanical impedance of this device will be very small at frequencies close to resonance; also, at these frequencies the response will be very large. In order to control the response and to provide a reasonably high mechanical impedance, so that the recorder is not unduly affected by irregularities, etc., in the wax, it is necessary to provide damping which will be effective at frequencies close to the resonant frequency of the moving parts and spring control, and with this in view electrical damping as described above, and as shown in Figures 3 or 4, for example, may be used, thus avoiding the difficulties associated with obtaining efficient mechanical damping. The natural resonance frequency of the recorder may be adjusted (by springs $h$ as described above), and the impedance of the shunt so chosen that at that frequency, the shunt impedance is small compared with the impedance of the recorder, in order that the resonance peak of the recorder is reduced to a normal value; while at other frequencies (particularly at very high frequencies) it will be of a value comparable with that of the recorder, which will therefore be operated more effectively.

Alternatively by suitably adjusting the thickness and masses of the members of the moving system it is possible to introduce additional resonances to modify the response characteristics. Thus, for example, the compliance of the pivotal shafts $e$, or the inertia of the stylus arm $i$, may be adjusted to give a high frequency resonance, which would then serve to modify the high frequency portion of the response curve.

From the above description it will be clear that many modifications of the recording device are possible and it must be understood that the description is given only to indicate the nature of the apparatus and must not be considered as having any limiting effect.

Figure 8:
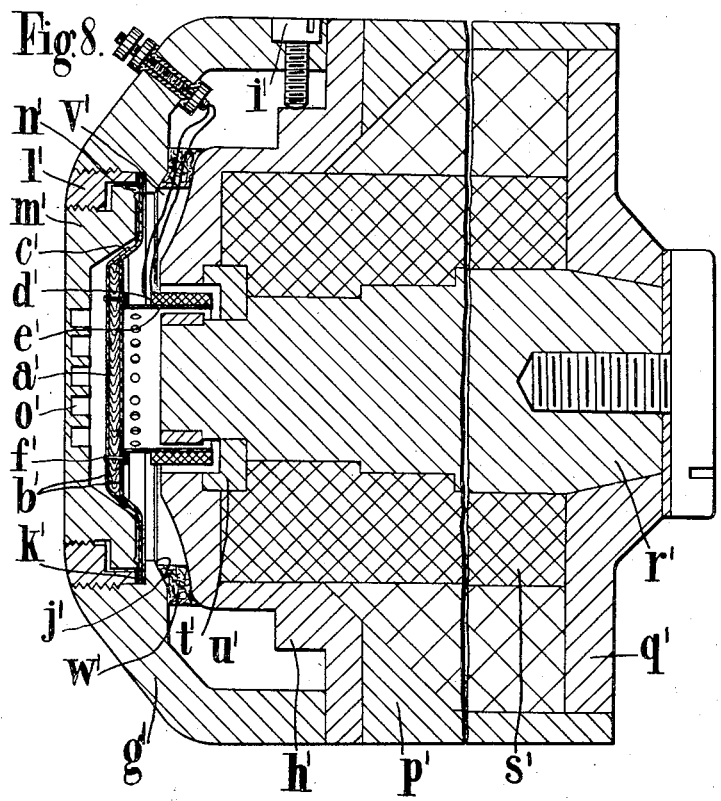
Figure 8 represents in section a microphone designed in accordance with the invention.

As stated above the invention covers any form of moving coil electro-mechanical apparatus and to demonstrate its applicability and wide ambit a description of a microphone constructed in accordance with the invention will now be given. It is desirable that the vibratory mechanical system shall have only one resonance, and to ensure this in the form of a microphone shown in Figure 8, the diaphragm is preferably formed sufficiently stiff, although light, to operate effectively, as a piston. As shown the diaphragm comprises a layer of Balsa wood $a'$ covered on each side by a thin sheet of aluminium, $b'$, pressed and waxed together to form a rigid structure. Alternatively the diaphragm may be formed only of Balsa wood or other wood allowing a highly rigid light diaphragm to be constructed; or it may be built up from a flat diaphragm of aluminium or other light alloy with cones of similar material attached to the back in order to brace the diaphragm to rigidity. The support may consist of a light elastic connection at the edges of the diaphragm and in the form shown consists of an extended annulus $c'$ of the back aluminium covering sheet. This sheet is pressed into the dish-shaped form shown in order that the plane of support by the annulus $c'$ may pass through the centre of gravity of the system supported. For increased flexibility the annulus $c'$ may be much thinner than the plate proper, this thinning being accomplished, for example, after the plates are fixed to the wood, by dissolving off some of the metal with caustic soda.

To the back of the diaphragm may be attached a coil $d'$ formed of thin enamelled aluminium wire wound on a thin aluminium former $e'$ which may be fixed to the diaphragm by rivets $f'$. In order to avoid short circuited turns the coil former may have in it a longitudinal saw cut extending almost to the diaphragm and may, before use, be insulated by a coating of aluminium hydroxide.

Conveniently the microphone may be more or less bottle-shaped (as shown), with a maximum diameter of, say, 3 inches, the body and neck of the bottle forming the magnetic system, while an attached holder, $g'$, for the diaphragm and moving coil forms the bottom of the bottle. This holder $g'$ may be fitted to the outer pole piece $h'$ of a small pot magnet by three, or more, centring screws, $i$; and the diaphragm and moving coil secured against a step $j'$ of the holder, between washers $k'$, by means of a screw threaded clamping ring $l'$. Held by screw threads tapped within the clamping ring $l'$ is a diaphragm stretching ring $m'$ which, on being screwed inwards, brings a small rounded ridge $n'$ to bear against the annulus $c'$ (which on account of its frailty and flabbiness tends to become wrinkled and distorted) thereby stretching it smooth and taut. As a matter of little importance it is to be noted that by means of this stretching ring a degree of control on the natural frequency of the diaphragm is also available.

Since the supporting annulus $c'$ is of very thin light material it offers very little impedance to forced vibrations at high frequencies and to avoid resonance therefrom and the production thereby of a change of pressure on the back of the diaphragm other than that due to movement of the diaphragm as a whole, it is desirable to prevent the incidence of sound waves directly upon it. To this end the stretching ring $m'$ may also act as a cover over the annulus and the outer edges of the diaphragm proper, so that only the centre portion of the diaphragm is exposed to directly incident sound waves. To protect the diaphragm from accidental damage the aperture in the ring $m'$ through which the sound waves proceed may be formed only of a number of small holes $o'$ drilled through the plate thus forming a grille which seems not to affect the acoustic properties of the device although serving admirably for protection.

The magnetic circuit as previously mentioned comprises a small pot magnet, and is formed of an outer pole piece $h'$, the case of the microphone $p'$, a rear plate, $q'$, and a centre pole piece $r'$, on which are mounted the windings $s'$. Between the inner and outer poles is a gap (which is shown excessively large in Figure 8 for convenience of illustration) in which the moving coil is positioned, and in order that the dimensions of this gap shall be correct a spacing ring $t'$ of brass, or, preferably, cadmium bronze, may be provided. This may be a force fit on the inner pole piece and a good fit in a groove in the outer pole piece and serves not only to space the poles correctly but also to reduce the inductance of the moving coil, being magnetically coupled with it and having a low resistance.

The inner pole piece is preferably made of cobalt iron or other material having a high saturation density; but the flux density in the other portions of the circuit may be kept quite low, and good magnetic iron of thickness sufficient for the strength required may conveniently be used. The windings $s'$ fill the body of the microphone between the pole pieces, and are preferably formed of two different gauges of wire the inner turns being of thinner gauge than the outer.

In order to avoid undue elastic straint on the diaphragm by the air between it and the poles of the magnet it is desirable that a reasonably large volume be enclosed. To this end a cavity $u'$ is provided between the holder $g'$ and the outer pole piece $h'$; and communicating with the rear of the diaphragm by an annular passage $v'$, in which may be inserted a ring of loose cotton wool $w'$ to damp resonance between the mass of air in the passage and the stiffness of the air in the main cavity. To avoid restraint due to air trapped within the moving coil former between the diaphragm and the inner pole piece holes may be drilled in the former as shown. The leads from the moving coil as shown pass through the annular passage and cavity to terminals on the holder $g'$ but if desired the terminals may be located at any other suitable position such for example as at the rear end of the microphone.

The moving coil may be, as previously described, shunted by a circuit which in its simplest form consists of an inductance condenser and resistance in series (Figure 1) although it will be understood that in practice the circuit may be more complex, e. g. Figure 2, provided that it is such as to reduce the impedance of the moving coil circuit at frequencies close to the mechanical resonance of the microphone.

It will be appreciated from the above description that the invention has wide application and is not limited to any form described or mentioned herein since it may be embodied in many types of electromagnetic devices such as sound recorders for lateral cut or for hill and dale recording, microphones, loud-speakers, and pick-ups and optical recording or projection devices and also for moving coil devices in which the moving coil is not directly coupled to the external electrical circuit but receives its impulses by induction from a transformer arrangement. It is further to be understood that the apparatus described is not limited to any constructional details or to materials or dimensions indicated, which are given purely by way of example, since we may modify and/or rearrange and/or omit various parts, and/or add any further members necessary to carry the invention into effect and achieve the object aimed at under various conditions and requirements which have to be fulfilled, without in any way departing from the scope of the invention.

We claim:

1. Electromechanical moving coil vibratory apparatus comprising means for producing a steady magnetic field, a moving coil moving in said magnetic field and operated by a circuit having an impedance higher than the resistance of the coil, electromagnetic means for damping the movement of the coil including a shunt circuit in which condenser and inductance elements are so combined as to give a shunting impedance which rises as the frequency increases from that corresponding to resonance of the mechanical system, at a rate initially less but finally greater than that obtained with a shunt consisting of an inductance and resistance in series.

2. An electromagnetic moving coil vibratory device wherein the moving coil operating circuit is shunted by a circuit connected directly across it equivalent to an inductance, resistance and condenser in series, the magnitudes of these components being in the same ratio as the magnitudes of the effective mass, damping and compliance of the mechanical system in the neighbourhood of resonance when the moving coil is closed by this circuit.

3. Electromechanical moving coil vibratory apparatus comprising means for producing a steady magnetic field, a moving coil movably mounted in said magnetic field and adapted to be set into operation by an operating circuit coupled thereto having an impedance higher than the resistance of the coil, and electromagnetic damping means for said coil comprising a shunt network of impedances connected directly across the energizing winding of said operating circuit and having an impedance which is low at frequencies in the neighbourhood of resonance of the mechanical system but high at frequencies remote therefrom, said shunt network including condenser elements tuned with the inductance of the circuit to resonate at a high frequency, whereby the impedance is matched with that of the amplifier output circuit and optimum energy transfer is effected.

ALAN DOWER BLUMLEIN.
HERBERT EDWARD HOLMAN.